United States Patent [19]

Gustafson

[11] 4,204,699
[45] May 27, 1980

[54] HITCH FOR DRAFT IMPLEMENT
[75] Inventor: Wayne Gustafson, Erskine, Minn.
[73] Assignee: Erskine Manufacturing Company, Inc., Erskine, Minn.
[21] Appl. No.: 961,738
[22] Filed: Nov. 17, 1978
[51] Int. Cl.² ............................................... B62D 53/00
[52] U.S. Cl. .................................. 280/415 R; 172/625
[58] Field of Search ........... 280/415 R, 415 A, 405 B, 280/456 A, 462, 411 R, 411 A, 412, 413; 172/248, 625

[56] References Cited
U.S. PATENT DOCUMENTS

| 2,658,770 | 11/1953 | Koenig | 280/415 R |
|---|---|---|---|
| 3,112,124 | 11/1963 | Bartel | 172/625 |
| 3,288,480 | 11/1968 | Calkins | 280/411 A |
| 4,119,329 | 10/1978 | Smith | 280/415 R |

Primary Examiner—Joseph F. Peters, Jr.
Assistant Examiner—Randall A. Schrecengost
Attorney, Agent, or Firm—H. Dale Palmatier

[57] ABSTRACT

A hitch for elongate implements such as a grain drill, the hitch including a draft frame with a dogleg shape, and a diagonal brace connected to the implement, a cable interconnecting the draft frame and diagonal brace and coordinating motion thereof, a spring-operated latch mechanism connecting and disconnecting the draft frame and diagonal brace, and a swingable connecting link at the forward end of the draft frame and a spring-operated latch mechanism maintaining the connecting link and draft frame in predetermined orientation.

12 Claims, 11 Drawing Figures

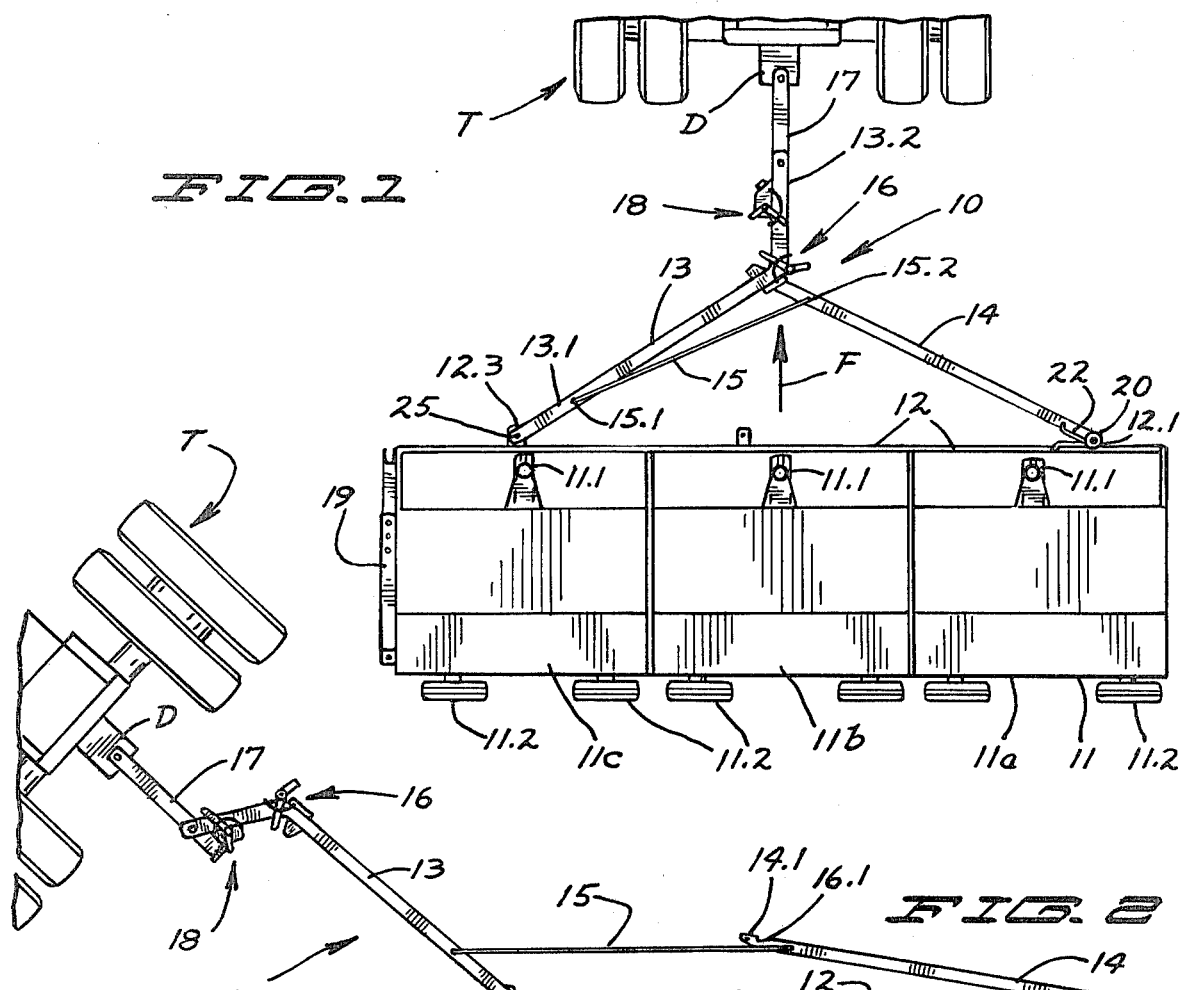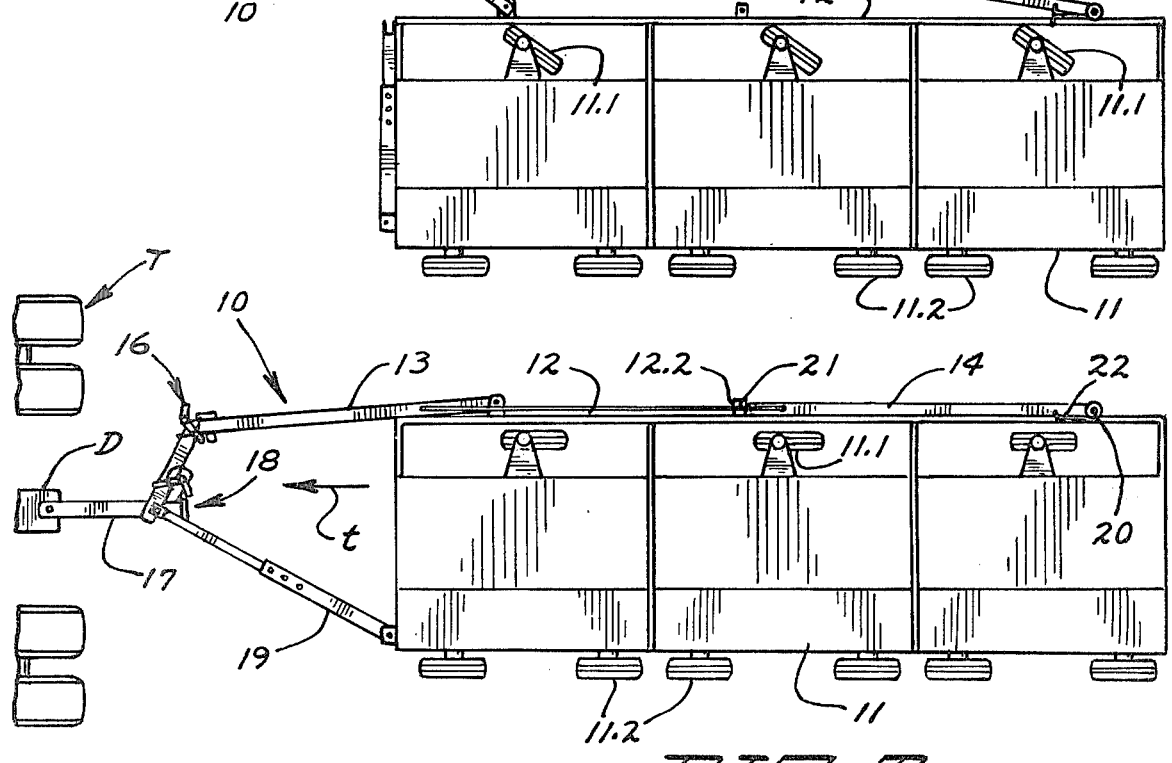

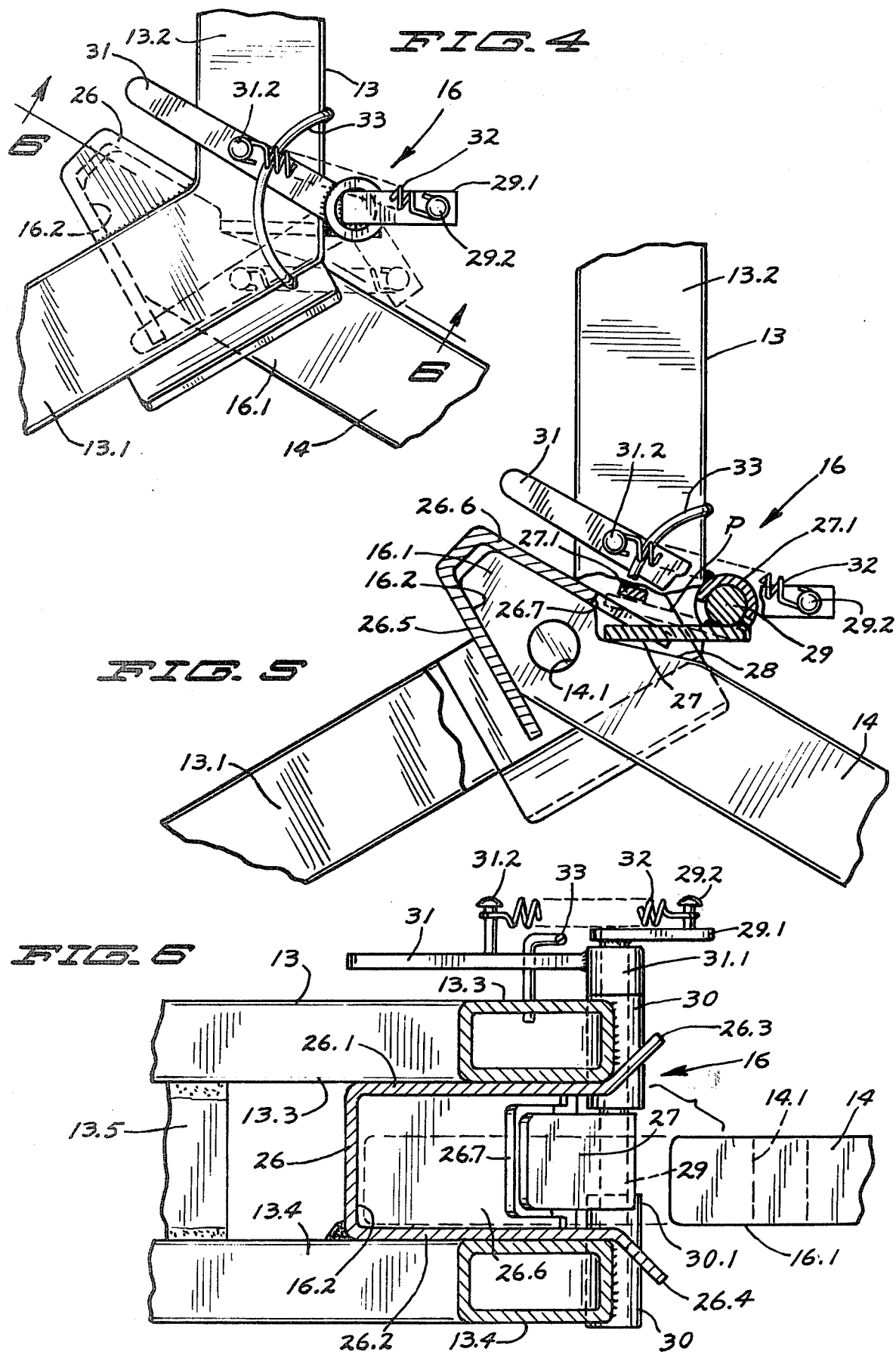

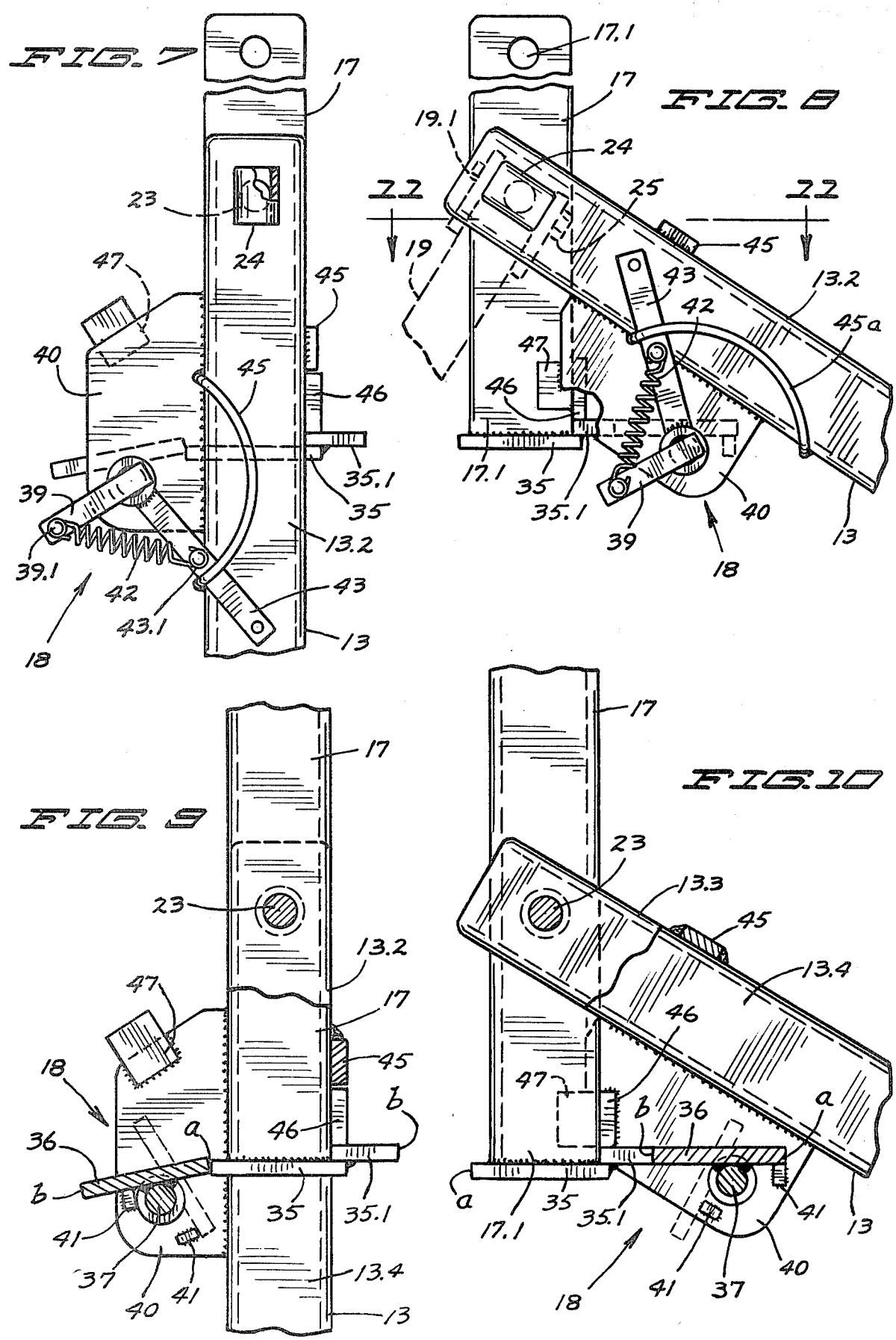

HITCH FOR DRAFT IMPLEMENT

TECHNICAL FIELD

This invention relates to hitches for agricultural draft equipment to be drawn behind a tractor, and more particularly, to a hitch readily adaptable for alternately drawing equipment such as elongate grain drills so that the grain drill is oriented transversely of the direction of travel while in field position and the grain drill is oriented longitudinally of the direction of travel when in transport position.

BACKGROUND OF THE INVENTION

As available labor becomes more and more high priced and scarce, it is extremely desirable that field equipment be well adapted so that it may be operated entirely by one man without requiring him to frequently dismount the tractor and go back to the draft equipment to make adjustments.

In draft equipment such as grain drills, oftentimes the grain drill is arranged in several sections which are arranged end to end so that, as the grain drill is drawn along behind the tractor, the grain drill will span a distance of twenty to thirty feet so that large areas can be planted in a relatively short length of time. The several sections of grain drills are connected together by an evener in front of the grain drills so that their orientation and physical arrangement with respect to each other is fixed. Usually, caster wheels are provided adjacent the evener to support the front portion of the grain drill.

The evener is attached to the drawbar of the tractor by a draft frame which has a substantial dogleg shape with a bend intermediate the ends. The front end of the draft frame is attached to the drawbar of the tractor, and the rear end of the draft frame, which is obliquely oriented with respect to the front end, is attached to one end of the evener.

The other end of the evener is connected to the draft frame by an obliquely extending brace which is swingably connected at its rear end to the evener and is detachably connected to the draft frame, approximately at the oblique bend, by a drop-in pin. This drop-in pin requires the assistance of a second man in order to connect and disconnect the brace.

When the field equipment such as the grain drill is to be transported along a lane or road, the brace must be disconnected and the draft frame swung around to the end of the elongate grain drill so as to pull the grain drill longitudinally of itself, thereby permitting the grain drill to pass through narrower spaces such as gates and narrow lanes.

BRIEF SUMMARY OF THE INVENTION

The present invention provides for the ready and easy changing of the connections at the draft frame so that the elongate draft equipment may be readily adapted for field use and also readily adapted for transport.

The diagonal brace is detachably connectable to the draft frame by a spring latch so that the brace may be connected and disconnected to the draft frame with a minimum of trouble and effort. The latch plate which is held against the brace by spring pressure normally holds the brace in seated relation in the latch mechanism. During disconnect, the latch plate of the latching mechanism is held in retracted position by the same spring which is swung to an over center position during the unlatching process.

Also, the draft frame is articulated at a location forwardly of the bend so as to define a connecting link portion of the draft frame which attaches directly to the drawbar of the tractor. This connecting link is alternately in alignment with and obliquely oriented with respect to the front portion of the draft frame for field and transport positions. A second spring pressed latching mechanism retains the connecting link in either alignment or oblique position with respect to the forward portion of the draft frame. A latch plate in this second latching mechanism is spring pressed into latching position in both positions of the connecting link so as to positively hold it against undesired reorientation.

A second diagonal brace connects to the connecting link when the field equipment is to be drawn in transport position.

A cable interconnects the rear portion of the draft frame with the draft frame brace so as to accurately position the forward end of the brace so that it may readily slip into the draft frame latch.

BRIEF DESCRIPTION OF THE DRAWINGS

FIG. 1 is a top plan view of the hitch with the implement in field position.

FIG. 2 is a top plan view of the hitch in shifted position, and with the implement between field position and transport position.

FIG. 3 is a top plan view of the hitch with the tractor and implement in transport position.

FIG. 4 is an enlarged top plan view of the draft frame and brace latch.

FIG. 5 is a view similar to FIG. 4, with portions thereof broken away for clarity of detail.

FIG. 6 is a detail section view taken approximately at 6—6 in FIG. 4, but showing the brace disassembled from the draft frame.

FIG. 7 is an enlarged top plan view of the forward portion of the draft frame and link latch.

FIG. 8 is a top plan view similar to FIG. 7, but with the portions thereof in shifted position.

FIGS. 9 and 10 illustrate the different functional positions of the latch plate and draft frame.

FIG. 11 is a detail section view taken approximately at 11—11 of FIG. 8.

DETAILED SPECIFICATION

Figure 22:
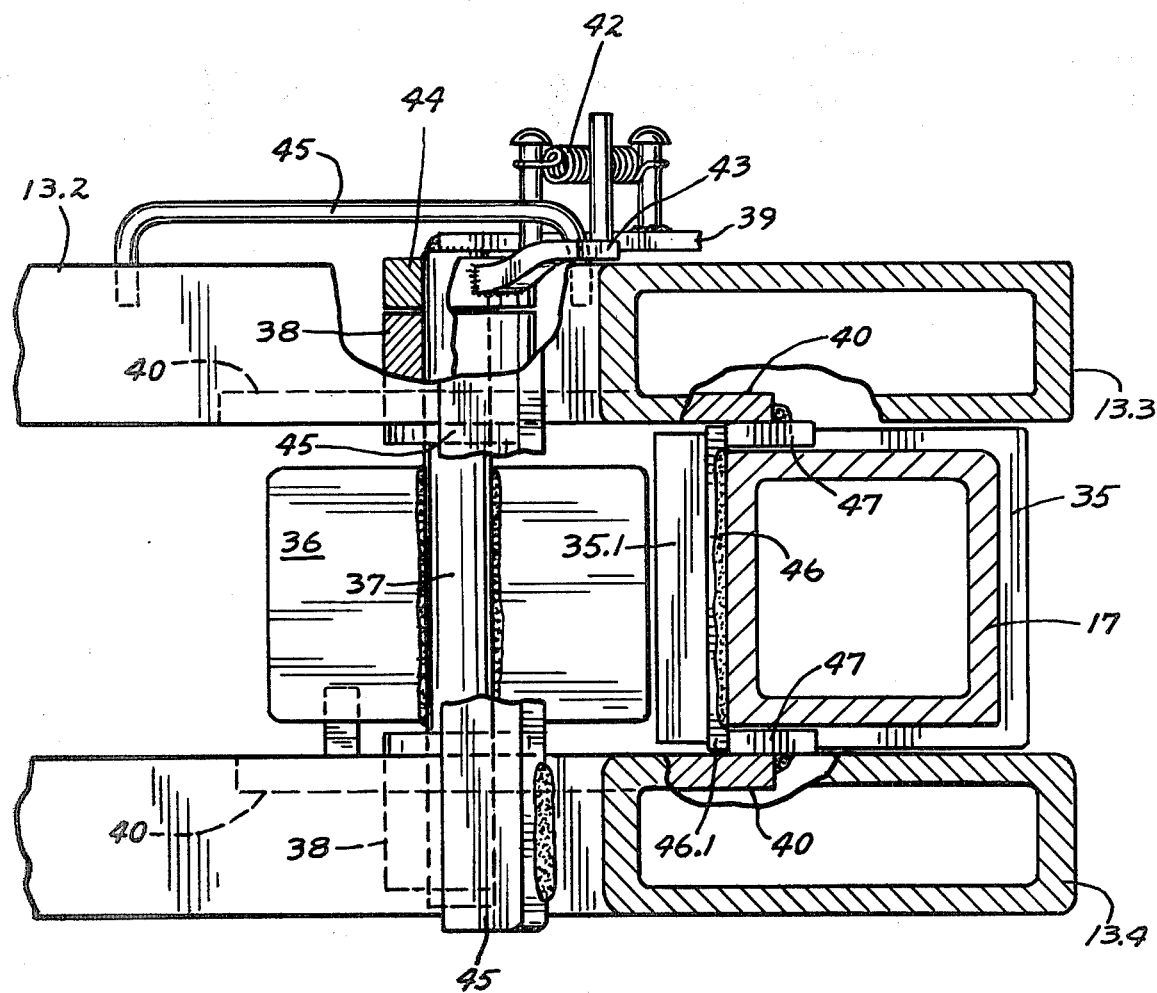

One form of the invention is shown in the drawings and is described herein. The hitch is indicated in general by numeral 10 and serves to connect the drawbar D of a tractor T with an elongate implement 11 to be drawn through the field. The implement may be a grain drill or other type of elongate implement, but, in the form illustrated, the implement 11 is in three distinct sections 11a, 11b and 11c. Each of the sections has a caster wheel 11.1 at its forward side for supporting the forward side of the implement in both field and transport positions. The implement 11 has an elongate evener 12 which extends longitudinally of the elongate implement and throughout substantially the entire length thereof so that the hitch 10 may be connected to the implement as a whole for drawing the implement through the field in a direction transversely of itself. This field position of the implement 11 with respect to the tractor T is illustrated in FIG. 1. The several sections 11a, 11b, and 11c retain their respective position with respect to each other in constant relation, regardless of whether the implement is traveling in the forward direction indicated by arrow F for field work, or whether the implement is traveling for transport in the direction of arrow t as indicated in FIG. 3.

It will also be noted that the implement 11 has a plurality of retractable transport wheels 11.2 which are oriented on the implement for travel in the direction of arrow t for transport of the implement, and which wheels may be raised and lowered in a manner known to persons of skill in the art so that the wheels may be used for transport as in FIG. 3, but may be retracted when the implement is used for field work when traveling in the direction of arrow F in FIG. 1. The raising and lowering of the wheels 11.2 has essentially no part of the present invention and therefore the retraction mechanism for the wheels 11.2 is not illustrated in detail.

The hitch 10 has a number of principal components including an elongate dogleg shaped draft frame 13, a brace 14 for the draft frame, a connecting cable 15 for coordinating the position and swinging of the draft frame and brace, a latch mechanism 16 by which the brace 14 is detachably connected to the draft frame 13, an attaching link 17 by which the front end of the draft frame is connected to the tractor drawbar, another latch mechanism 18 by which the position of the connecting link 17 relative to the draft frame is controlled and released, and a second telescoping brace 19 at the leading end of the implement 11 for use during transport.

The draft frame 13 has a rear end section 13.1 and a forward section 13.2 which extend obliquely of each other and give the draft frame 13 a characteristic dogleg shape. The rear end 13.1 of the draft frame extends obliquely forwardly from the evener 12 in converging relation with the brace 14 which also extends obliquely forwardly from the evener 12.

The brace 14 is constructed of steel tubing with a rectangular cross section for strength and lightness, and has its rear end connected by a pivot 20 to ears 12.1 on the evener 12, thereby adapting the brace 14 for swinging in a horizontal plane between field position which is illustrated in FIG. 1, and rest or transport position illustrated in FIG. 3 wherein the brace 14 extends along and in juxtaposition with the evener 12 and is retained in this position by a pin 21 extending through apertured ears 12.2 on the evener 12 and also through an aperture 14.1 at the forward end of the brace.

A spring 22 embraces the pivot pin 20 and bears against both the brace 14 and evener 12 and continuously urges the brace 14 forwardly away from the evener 12 toward the field position illustrated in FIG. 1.

The draft frame 13 is constructed of a pair of rigid tubes 13.3 and 13.4 arranged in superposed and spaced relation with each other and interconnected by a number of rigid struts 13.5 which are welded to the tubes. Both of the tubes 13.3 and 13.4 are substantially identical in shape and extend along each other for substantially the full length of the draft frame. The spaced apart rigid tubes 13.3 and 13.4 of the draft frame receive the connecting link 17 therebetween and are connected to the connecting link by a pivot pin 23 which permits limited side-to-side swinging of the connecting link between distinct positions with respect to the draft frame 13. As seen in FIG. 11, the connecting link 17 is also formed of rigid steel square tube stock 17 which has an aperture 17.1 at its front end by which the connection to the drawbar D of the tractor is made.

The pivot pin 23 has a horizontally oriented rigid sleeve 24 welded on its upper end for receiving a connecting bolt or pin 25 by which the end of the telescoping brace 19 may be connected to the draft frame in transport position as illustrated in FIG. 3. It will be recognized that the outer end of the telescoping brace 19 has ears 19.1 thereon which embrace the ends of sleeve 24 and allow the connecting pin 25 to be inserted through apertures in the ears 19.1 and through the sleeve 24.

The cable 15 is anchored by a pin 15.1 at one end to the rear end of the draft frame 13 adjacent the connection thereof to the evener 12 and the ears 12.3 thereof which receive the pivot pin 25 therethrough and through the end of the draft frame. The cable 15 is also anchored by a second anchor in 15.2 to the forward end of the rigid brace 14 so as to carefully coordinate the swinging of the brace 14 with respect to the draft frame 13. The cable 15 so positions the front end of the brace 14 as to cause assembly of the latch insert 16.1 on the front end of brace 14 with the latch socket 16.2.

The latch socket 16.2 is formed by a rigid steel weldment 26 which has top and bottom panels 26.1 and 26.2 respectively defining upwardly and downwardly flared guiding flanges or lips 26.3 and 26.4 to guide the latch insert 16.1 therebetween and into the latch socket 16.2.

The weldment 26 also defines upright sidewalls 26.5 and 26.6 which diverge from each other toward the open front of the socket for accurately positioning the tapered tip end of the socket insert 16.1.

The sidewall 26.6 of the weldment is recessed at 26.7 to receive a rigid tiltable latch plate 27 which alternately swings through the recess 26.7 into the latch socket 16.2, or out of the latch socket to the dotted line position P illustrated in FIG. 5. The latch plate 27 interfits with the keeper notch 28 in the latch insert 16.1 for the purpose of retaining the latch insert 16.1 in the socket and thereby retaining the brace 14 in coupled relation with the draft frame 13.

The rigid latch plate 27 is affixed as by welding to a mounting sleeve 27.1 which is affixed as by welding to a vertically oriented hinge pin 29 rotatably mounted in a pair of bearing sleeves 30 respectively welded to the upper and lower draft frame tubes 13.3 and 13.4.

The upper end of the hinge pin 29 is affixed as by welding to an operating lever 29.1 which is spaced upwardly from the top of the upper bearing sleeve 30.

An operating handle 31 is affixed as by welding to a mounting sleeve 31.1 which is mounted on the hinge pin 29 for rotation relative to the hinge pin so that the handle 31 may be swung from side to side relative to the hinge pin. The handle 31 underlies a rigid and stationary guide bar 33, the depending ends of which are welded to the upper tube 13.3 of the draft frame to control the limits of swinging of the handle.

A coil spring 32 has one end connected to an anchor pin 29.2 rigid with the lever 29.1, and the spring has its opposite end anchored to another anchor pin 31.2 which is rigid with the operating handle 31.

The spring 32 is oriented to lie close to the rotation axis of the hinge pin 29, and when the handle 31 is swung in opposite directions, the spring 32 swings bodily through or across the rotation axis of the hinge pin 29 so as to move over center and cause the turning force on lever 29.1 to be reversed. For instance, as illustrated in FIG. 4 in full lines, the spring 32 continues to urge the operating lever 29.1 to revolve in a counterclockwise direction, thereby maintaining the latch plate 27 in the keeper notch 28 of the latch insert. However, when the handle 31 is swung to the dotted line position thereof, the spring 32 is swung across the rotation axis of hinge pin 29 to a new position where thrust on the operating lever 29.1 causes it to swing in a clockwise direction, thereby swinging the latch plate 27 out of the keeper notch 28 in the latch insert 16.1.

Swinging of the latch plate 29 in a clockwise direction is limited by a stop 27.1 formed by a rigid steel strap traversing the outer side of the recess 26.7 of the weldment sidewall 26.6. Swinging of the latch plate 27 in the opposite, or counterclockwise direction is restricted by a stop shoulder 30.1 bearing against the latch plate in the full line position illustrated in FIG. 5.

It will be recognized that the latching mechanism does not have to be attended to at the moment of latching or unlatching and that once the position of the handle 31 is preset, the operator of the equipment may go back to the tractor and attend to the positioning of the tractor with respect to the implement. When the latch mechanism 16 is in the position illustrated in FIGS. 4 and 5, swinging of the handle 31 to the dotted line position of FIG. 4 changes the torque applied to the latch plate 27 and causes the latch plate to retract from the keeper notch 28 of the latch insert. Thereafter when the tractor is moved ahead, the draft frame 13 and socket 16.2 pulls away from the latch insert 16.1 of the brace 14 and the disconnection of the draft frame from the brace is completed. In the event that the latch plate does not immediately swing under influence of the pressure, a slight movement of the tractor will cause relief of the binding conditions that may occur and thereafter the spring will cause swinging of the latch plate.

When the draft frame is again to be connected by the latch mechanism to the brace 14, the handle 31 will simply be positioned to the full line position illustrated in FIGS. 4 and 5, and then the tractor will be manipulated so as to swing the draft frame 13 into position illustrated in FIG. 1, whereupon the latch insert 16.1 of brace 14 will slip into the socket 16.2, camming the latch plate out of the way slightly until the latch plate 27 can seat in the keeper notch 28. The draft frame 13 is thereby properly connected to the brace 14 for operating the implement in field work.

The latch mechanism 18 for retaining the connecting link 17 in alternate positions with respect to the draft frame 13 is illustrated in detail in FIGS. 7-11. It will be recognized that the end 17.1 of the connecting link is disposed in spaced relation to the pivot pin 23 so that the latch mechanism 18 as a whole is spaced well away from the pivot pin.

A transverse abutment panel or plate 35 has a slightly offset portion 35.1 and is affixed as by welding to the end of the connecting link 17.

A rigid, but tiltable latch panel 36 is carried by the front end 13.2 of the draft frame so that the latch panel 36 will be located at opposite edges of the abutment panel 35, 35.1 in alternate positions of the connecting link relative to the draft frame. These two positions are illustrated in FIGS. 9 and 10 and in FIGS. 7 and 8, respectively.

In the positions illustrated in FIGS. 7 and 9 wherein the connecting link is aligned with the front end 13.2 of the draft frame, the edges a of the abutment panel 35 and latch panel 36 are in confronting and abutting relation to each other; and in the position of the connecting link 17 illustrated in FIGS. 8 and 10 wherein the connecting link is obliquely oriented with respect to the front end of the draft frame, the edges b of the stationary abutment panel 35.1 and of latch panel 36 are in confronting and abutting relation to each other. Accordingly, the combined effort of the latch panel 36 and abutment panels 35, 35.1 retain the connecting link 17 and draft frame in alternate distinct positions with respect to each other.

The latch mechanism also includes a hinge pin 37 which is affixed as by welding to the latch panel 36 and extends vertically into a pair of rigid bearing sleeves 38 which are affixed as by welding to upper and lower rigid and stationary mounting plates 40 which are welded to the draft frame 13. The upper end of the hinge pin 37 is spaced above the top of bearing sleeve 38 and has an operating lever 39 affixed thereto. Operating lever 39 swings with the hinge pin and latch panel to the two distinct alternate positions so that the latch panel 36 will swing to either of the full line positions illustrated in FIGS. 9 and 10 and the dotted line positions are illustrated therein. Stops 41 are welded on the lower mounting plate 40 to engage the latch panel in its extremes of swinging movement and to limit the movement thereof so that the correct edges of the latch panel will confront and abut against the corresponding edges of the abutment panel 35, 35.1.

A coil spring 42 is connected by an anchoring pin 39.1 to the operating lever 39 and is also anchored by a pin 43.1 to an operating handle 43.

Handle 43 is affixed as by welding to a mounting collar 44 which is rotatably mounted on the upper end of hinge pin 37 so that the handle 43 may swing relative to hinge pin 37 and latch panel 36. Swinging of handle 43 is limited by a guide rod 45a, the depending ends of which are affixed as by welding to the upper draft frame 13.3. The handle 43 controls the orientation of spring 42 and causes the spring 42 to swing transversely through the rotation axis of hinge pin 37, thereby reversing the torque applied to the operating lever 39. Accordingly, the handle 43 will control the swinging of the latch panel 36.

It will be recognized that when the latch panel 36 is swung to the dotted line position illustrated in FIG. 10, the connecting link 17 and draft frame 13 are free to swing with respect to each other into the position of FIG. 9. When such swinging occurs, the latch panel 36 swings along an arc of circumference about the center of pivot pin 23 and will move along the abutment panel 35 in face-to-face relation until the entire latch panel 36 has passed by the abutment panel 35 whereupon the edge a of latch panel 36 will be urged by spring 42 into abutting relation with the corresponding edge a of abutment panel 35.

Counterclockwise swinging of the connecting link 17 relative to draft frame 13, as seen in FIGS. 7-10, is limited by a stop defined by a rigid steel strap 45 extending vertically between the upper and lower draft frame tubes 13.3 and 13.4 and affixed thereto as by welding. Strap 45 will bear against the side of connecting link 17 as illustrated in FIG. 9 and prevent any further counterclockwise swinging of the connecting link relative to the draft frame.

Clockwise swinging of the connecting link 17 relative to the draft frame 13 is limited by a rigid steel strap 46 attached as by welding to the side of connecting link 17 as by welding and adjacent the abutment panel 35, 35.1. The upper and lower ends 46.1 of the strap 46 protrude upwardly and downwardly beyond the limits of connecting link 17 to confront and abut against stop lugs 47 respectively affixed upon the upper and lower mounting plates 40. The connecting link 17 effectively swings between the stop lugs 47 until the ends of strap 46 engage these stop lugs to restrict any further clockwise swinging of the connecting link relative to the draft frame as illustrated in FIGS. 9 and 10.

In operation, the implement will be drawn by the tractor through the field in the direction of arrow F as illustrated in FIG. 1. When transporting the implement along lanes and roads, the implement will be drawn in the manner illustrated in FIG. 3 and in the direction t.

When the tractor and implement are to be reoriented from the transport position of FIG. 3 to the field position of FIG. 1, the telescoping brace 19 is disconnected from the draft frame and swung back to the rest position illustrated in FIGS. 1 and 2. The pin 21 will be removed so that the brace 14 is free to swing away from the evener 12.

Thereafter, the latch mechanism 18 is adjusted for field position by swinging the handle 43 clockwise to the position of FIG. 7. Even though the connecting link 17 remains in oblique orientation with respect to the draft frame 13, temporarily, the latch panel 36 will tilt to the dotted line position of FIG. 10 which is the same as the full line position of FIG. 9 so as to be prepared to engage edge a of abutment panel 35 after reorientation of the connecting link and draft frame.

The latch mechanism 16 is also adjusted to be prepared for field position, and accordingly, the handle 31 is swung in a clockwise direction as illustrated in FIGS. 4 and 5 so that the latch plate 27 is tilted into the latch socket 16.2 which, at this time, is empty because the draft frame 13 is disposed well away from brace 14.

The tractor T is then driven and manipulated so as to swing the draft frame through the position illustrated in FIG. 2 to the position illustrated in FIG. 1. As the draft frame 13 is swung to a position in front of the implement 11, spring 22 will swing the brace 14 to the extent permitted by cable 15 which coordinates the swinging of the brace 14 with that of draft frame 13. As the draft frame 13 approaches the position illustrated in FIG. 1, the latch insert 16.1 of the brace 14 approaches the socket 16.2 in the manner illustrated in FIG. 6. Thereafter, the latch insert 16.1 slips into the socket 16.2 and seats itself in the position illustrated in FIG. 5.

As the latch insert 16.1 moves into the socket 16.2, the end of the insert 16.1 will engage the latch plate 27 and push it out of the way temporarily. As the insert 16.1 continues to move into the socket, the latch plate 27 will be moved into the keeper notch 28 by spring 32.

During the swinging of the draft frame 13 from the position illustrated in FIG. 3 to that illustrated in FIG. 2, the connecting link 17 will be manipulated into substantial alignment with the front end 13.2 of the draft frame, whereupon the abutment panel 35, 35.1 swings along an arc of circumference, and across the front of latch panel 36, and when the connecting link 17 and front portion 13.2 of the draft panel are in substantial alignment, the latch panel 36 will shift into edge-to-edge abutting relation to each other.

It will therefore be seen that by simple adjustment of the two latch handles 31 and 43, the latch mechanisms may be preset to move into their proper latching relationships without further adjustment.

When the field work is completed and the implement is again to be transported in the manner of FIG. 3, the two latch mechanisms 16 and 18 will again be preset for releasing their immediate positions and to cause the latch mechanism to readjust into a second position. Opposite swinging of the handles 43 and 31 causes release of the two latch mechanisms 16 and 18, respectively, and the latch mechanism 18 will latch the connecting link 17 in oblique relation with the front end of the draft frame in the manner illustrated in FIGS. 9, 10 and 2.

Simple connection of the telescoping brace 19 facilitates travel by the tractor and implement in transport position along narrow lanes, through gates and down roads.

It will be seen that I have provided a new and improved hitch for elongate implements wherein the draft frame and diagonal brace have their relative movements closely coordinated so that the brace may be simply latched by a spring operated latch mechanism to the draft frame. The forward portion of the draft frame may be articulated to the desired position by the preadjustment of a second latch mechanism which holds the connecting link of the draft frame in desired position.

What is claimed is:

1. A hitch for connecting a tractor with a drawbar to an elongate field implement having an evener at the elongate forward side of the implement and also having a leading end adjacent one end of the evener, comprising a rigid elongate draft frame having a forward end with means for attachment to the tractor drawbar and also having a rear end with means for pivotal connection to said one end of the implement evener, the draft frame being swingable between a field position wherein the draft frame extends generally obliquely forwardly from the evener and a transport position wherein the draft frame extends along the evener and toward and beyond the leading end of the elongate implement, an elongate draft frame brace with means for pivotal connection to another end of the implement evener opposite said one end thereof, the brace being swingable between a rest position extending along the evener and a field position extending obliquely forwardly from the evener and in converging relation with the draft frame, spring means connected with the brace and having means to bear against the evener and urging the brace toward said field position, position coordinating means connected with both of the draft frame and brace and coordinating swinging of the draft frame from transport position to field position with swinging of the brace from rest position to field position, and spring-operated latch means on the brace and on the draft frame and connecting the draft frame and brace together when both of the draft frame and brace are swung into forwardly converging relation to each other and their respective field positions.

2. The hitch according to claim 1 and said position coordinating means guiding the brace and draft frame together when being swung to said respective field positions to cause latching together by said latch means.

3. The hitch according to claim 2 wherein said position coordinating means includes a cable connected with the draft frame adjacent said pivot means and with the brace adjacent the latch means and coordinating swinging of the brace with swinging of the draft frame.

4. The hitch according to claim 1 and said latch means including a latch socket on the draft frame and a latch insert on the brace and insertable into the latch socket, the insert having a keeper notch on the side thereof and the latch socket having a latch plate normally spring pressed into said keeper notch.

5. The hitch according to claim 4 and said latch plate swinging about an axis extending transversely of the latch insert, a coil tension spring attached to the latch plate and extending transversely of and adjacent said axis and handle means connected with the spring and reorienting the spring with respect to said axis for swinging the latch plate toward and away from the keeper notch of the latch insert.

6. The hitch according to claim 1 and said draft frame having a substantial dogleg shape and a bend between the forward and rear ends thereof, the attachment means on the draft frame including a rigid elongate connecting link connected with a pivot pin to the forward end of the draft frame, the connecting link being swingable from side to side between a field position wherein the connecting link is oriented substantially normal to the evener when the draft frame is also in field position, and a transport position wherein the connecting link extends substantially longitudinally of the elongate implement when the draft frame is also in transport position,
- a second latch means on the draft frame and connecting link and retaining the connecting link alternately in field position and transport position with respect to the draft frame, and
- a second brace means detachably connected to the draft frame and leading end of the implement in the transport position of the draft frame.

7. A hitch for connecting a tractor to an elongate field implement and alternately drawing the elongate implement longitudinally of itself for transport and drawing the elongate implement transversely of itself for field work, such tractor having a drawbar, and such an implement having a leading end for transport and an elongate forward side for field work, and an elongate evener extending along the forward side, comprising
- an elongate rigid draft frame having a forward end with attachment means for attachment to the tractor drawbar and also having a rear end with means for pivotal connection to one end of the evener adjacent the leading end of the implement, the draft frame being swingable between a first field position wherein the draft frame extends generally transversely of the elongate implement and forwardly of the elongate forward side of the implement for field work, and a second transport position wherein the draft frame extends generally longitudinally of the elongate field implement and evener and from said one end of the evener,
- first brace means detachably connected to the draft frame and evener in the field position of the draft frame,
- second brace means detachably connected to the draft frame and leading end of the implement in the transport position of the draft frame, and
- the attachment means of the draft frame including a rigid elongate connecting link connected with a pivot pin to the forward end of the draft frame for swinging from side to side of the draft frame between distinct positions and for orienting the draft frame in different positions relative to the tractor drawbar for field work and transport of the implement, and the attachment means also including a spring-operated latch means on the connecting link and adjacent the draft frame and alternately retaining the connecting link in either of said distinct positions.

8. The hitch according to claim 7 and the latch means including a spring pressed swingable latch panel having opposite edge portions respectively retaining the connecting link in said separate distinct positions.

9. The hitch according to claim 7 and the latch means also including a stationary abutment panel affixed on one of the connecting link and draft frame and a tiltable latch panel on the other of the link and frame, both of the abutment panel and latch panel being spaced from the pivot pin adjacent each other and substantially along arcs of circumference about the pivot pin to allow the abutment and latch panels to swing past each other in generally confronting relation, the latch panel having opposite edges tiltable with the latch panel into abutting relation with corresponding edges of the abutment panel to retain the link in such distinct positions.

10. The hitch according to claim 9 and said tiltable latch panel being tiltable about an axis extending transversely of said connecting link, stop means limiting tilting of the latch panel between alternate tilted positions wherein edges of the latch panel and abutment panel are in confronting and abutting relation in such distinct positions of the connecting link.

11. The hitch according to claim 10 and including a coil spring attached to said latch panel and extending transversely of and adjacent the tilt axis of the latch panel to permit swinging of the latch panel to said alternate tilted positions, the spring moving transversely of itself and through the tilt axis and being anchored on a handle also swingable about said axis to move the spring to over center position with respect to the latch panel for swinging the latch panel to said tilted position.

12. A hitch for connecting a tractor with an elongate drawbar to an elongate field implement having an evener at an elongate forward side of the implement and also having a leading end adjacent one end of the evener, comprising
- a rigid elongate draft frame having a forward end with means for attachment to the tractor drawbar and also having a rear end with means for pivotal connection to said one end of the implement evener for swinging between a field position wherein the draft frame extends generally forwardly of the implement and a transport position wherein the draft frame extends generally longitudinally of the elongate field implement and evener and from said leading end of the implement,
- a brace extending obliquely from the draft frame for connection with the evener of the implement, a first latch means detachably connecting the brace with the draft frame intermediate the front and rear ends thereof,
- the attachment means of the draft frame including an elongate rigid connecting link swingable from side to side as the draft frame is moved from field position to transport position,
- a second latch means between the connecting link and draft frame and alternately connecting the connecting link in alternate positions after swinging side to side with respect to the draft frame, and
- a second brace means interconnecting the draft frame with the leading end of the implement when the draft frame is in transport position.

* * * * *